United States Patent

[11] 3,591,920

| [72] | Inventors | Wallace E. Brainard<br>New Berlin;<br>Erich F. Drechsler, Milwaukee, both of, Wis. |
|---|---|---|
| [21] | Appl. No. | 752,242 |
| [22] | Filed | Aug. 13, 1968 |
| [45] | Patented | July 13, 1971 |
| [73] | Assignee | Kearney & Trecker Corporation<br>West Allis, Wis. |

[54] TOOL CHANGE MECHANISM WITH MAGAZINE POSITIONING MEANS
10 Claims, 28 Drawing Figs.

[52] U.S. Cl. .................................................. 29/568
[51] Int. Cl. .................................................. B23q 3/157
[50] Field of Search .......................................... 77/25; 29/568

[56] References Cited
UNITED STATES PATENTS

| 3,300,856 | 1/1967 | Daugherty .................. | 29/568 |
| 3,412,459 | 11/1968 | Hollis ........................ | 29/568 |
| 3,073,024 | 1/1963 | Hutchens et al. ............ | 29/568 |
| 3,128,645 | 4/1964 | Anthony ...................... | 29/568 X |
| 3,217,406 | 11/1965 | Dever ......................... | 29/568 |
| 3,312,370 | 4/1967 | Kolarich et al. ............. | 29/568 X |

FOREIGN PATENTS

| 1,235,705 | 3/1967 | Germany .................... | |

*Primary Examiner*—Andrew R. Juhasz
*Assistant Examiner*—F. R. Bilinsky
*Attorneys*—Donald E. Porter, Cyril M. Hajewski and William C. Gleisner ABSTRACT: A magazine for storing heavy tools fixedly mounted at the rear of an automatic tape control machine tool, having means for the tape control of selected tools and the presentation of each selected tool to the vicinity of the vertically movable toolhead wherever it has stopped after one cycle of machining operation, and a simple unitarily moving tool changer for receiving the selected tool at the rear of the machine tool, carrying it to the front of the machine tool and exchanging it for the tool in the spindle that is projecting from the front of the machine tool incident to another cycle of machining operation.

INVENTOR
WALLACE E. BRAINARD
ERICH F. DRECHSLER
ATTORNEY 3,591,920

TOOL CHANGE MECHANISM WITH MAGAZINE POSITIONING MEANS

BACKGROUND OF THE INVENTION

It is now known to provide a tape control machine tool, controlled for cycles of machining with a different tool at each cycle and a magazine for the storage of the tools to be used in the different cycles together with a tool changer for removing selected tools from the magazine and exchanging them for the tool in the spindle in between cycles, as shown by Brainard Re. U.S. Pat. No. 25,737. The patents to Hain U.S. Pat. No. 3,129,506, Dever U.S. Pat. No. 3,217,406, and the British Pat. No. 1,075,803, to Evans July 12, 1967 each disclose the idea of providing a magazine for tools at the rear of the machine and a tool changer that transfers the tools from the rear of the machine to the spindle at the front of the machine, but, in each of these patents, the tool changer is a complicated changing mechanism such as a two-stage changer wherein the tool is picked out of the magazine with one changer and transferred to the other changer for placement in the spindle as shown by Hain and Dever, whereas in Evans, the changer is in two parts, each part moving independently of the other. Also, in Evans, the magazine is mounted on the vertically moving spindlehead and in Dever, the tool magazine is mounted on a column that guides the spindlehead for vertical reciprocation.

SUMMARY OF THE INVENTION

The present invention avoids mounting the tool magazine on the spindlehead by mounting the same either on the base of the machine or on the column of the machine which vertically guides the spindlehead in its vertical adjustments. This removes the weight of the assembly of tools from the spindlehead allowing the better control of the spindlehead and likewise enabling the use of very heavy tools if it is so desired. A tool changer is here disclosed as being rotatably and slidably mounted on the spindlehead and carrying tool carriers which move unitarily to the rear of the machine to pick up a selected tool and then move unitarily to the front of the machine wherein the empty carrier picks up the tool then in the spindle and the carrier with the selected tool places the selected tool in in the spindle. In this operation, there has to be a selected interchange location setting up the position of the selected tool in relationship to the position of the spindle and in Dever, the selected tool is always presented to a set position and it is the spindlehead that has to move to the selected position for the interchange, whereas in the instant case, the selected tool is carried to any position that the spindlehead may stop at the end of one cycle of machining. In order to accomplish this, the magazine is in the chain form with one vertical run of the chain lying along the length of the column so that after a tool is selected at a set location in the vertically extent of the column, a mechanism is set so that when the tape calls for an interchange, the chain will move the selected tool to the position of the spindlehead, and, in this position, the mechanism will step the chain. The invention, therefor, frees the spindlehead from the heavy load of the tool magazine yet provides a simple unitarily moving tool exchanger for exchanging the tools between the magazine and the spindle and further eliminates the need for the spindlehead to always move to a particular location for the interchange.

BRIEF DESCRIPTION OF THE DRAWINGS

Further obvious features and advantages of the present invention will become more apparent from the following detailed description of the preferred embodiment shown in the accompanying drawings, in which.

DETAILED DESCRIPTION OF THE DRAWINGS

Figure 1:
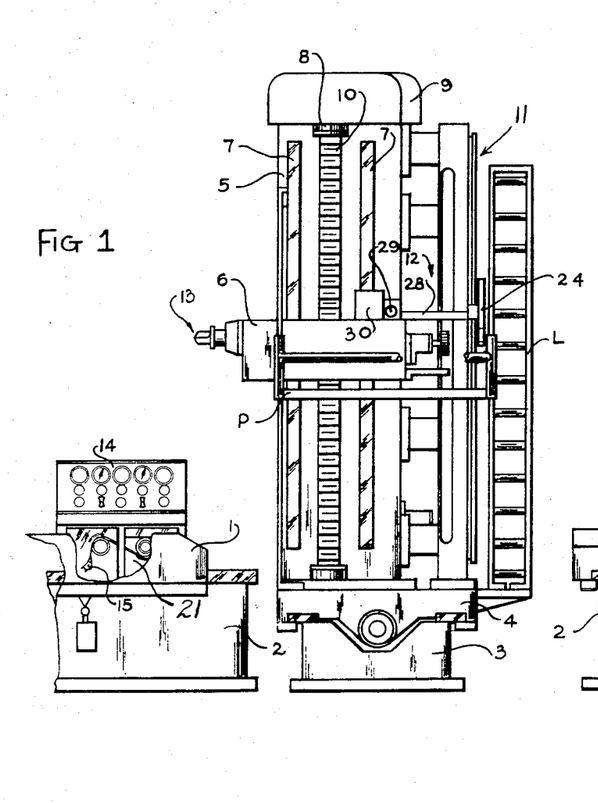
FIG. 1 is a right side view in elevation of the machine tool showing the upright column mounting the spindlehead and its relation to the tool magazine, worktable, and console.

In FIG. 1, a worktable 1 is shown slidably mounted for backward and forward horizontal movement on the base 2 in front of the base 3 which slidably mounts the saddle 4 for horizontal sideways movement and, extending above the saddle, is a column 5 which supports the spindlehead 6 for vertical movement along the guideways 7. Mounted in the cap 9 at the top of the column is a motor 8 that drives the vertical screw 10 for moving the toolhead along the guideway 7. The magazine 11 is mounted at the rear of the column and is adapted to supply selected tools to the tool changer 12 which exchanges the selected tools with the tool 13 carried by the spindle. The spindlehead is provided with a platform P for the convenience of the operator, access being by means of a vertical ladder L. Well-known mechanisms are provided for moving the saddle and the worktable and controlling the machine by tape including the console 14 that houses the punched tape 15 which is read by the tape reader 21. The punched tape not only controls the various movements of the parts of the machine tool in a machining operation in cycles, but also controls the selection of the tools for the next cycle and the interchange of that tool.

Figure 2:
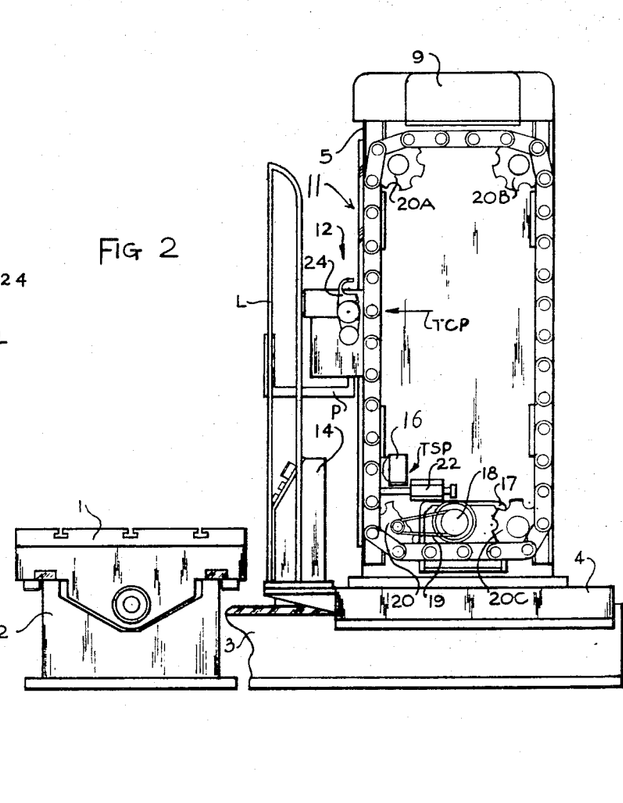
FIG. 2 is a rear view of the machine tool of FIG. 1, showing the chain-type tool storage magazine mounted at the rear of the column.

FIG. 2 shows a rectangular outline of the chain links forming the chain-type magazine as well as the position where the tool is selected and one possible position in which the tool is exchanged. The tools are individually coded, for instance as shown in the Brainard patent aforesaid. A housing 17 provides a motor 18 for driving the belt 19 and sprocket 20 for moving the plurality of tools carried by the chain magazine past the reading head 16. When the next desired tool stored in the magazine 11 has been identified by the operation of the code-reading head 16, the magazine will stop. The tool selection operation is carried out while the machine is operating during a machining operation and is effected by the tape impressing the identification number of a desired tool upon the electrical control system and when the coded number of a tool in the magazine 11 read by the reader 16 coincides with the number impressed upon the electrical control system, the operation of the motor 18 will be discontinued, thereby stopping the movement of the chain magazine 11.

Figures 3, 4, 5:
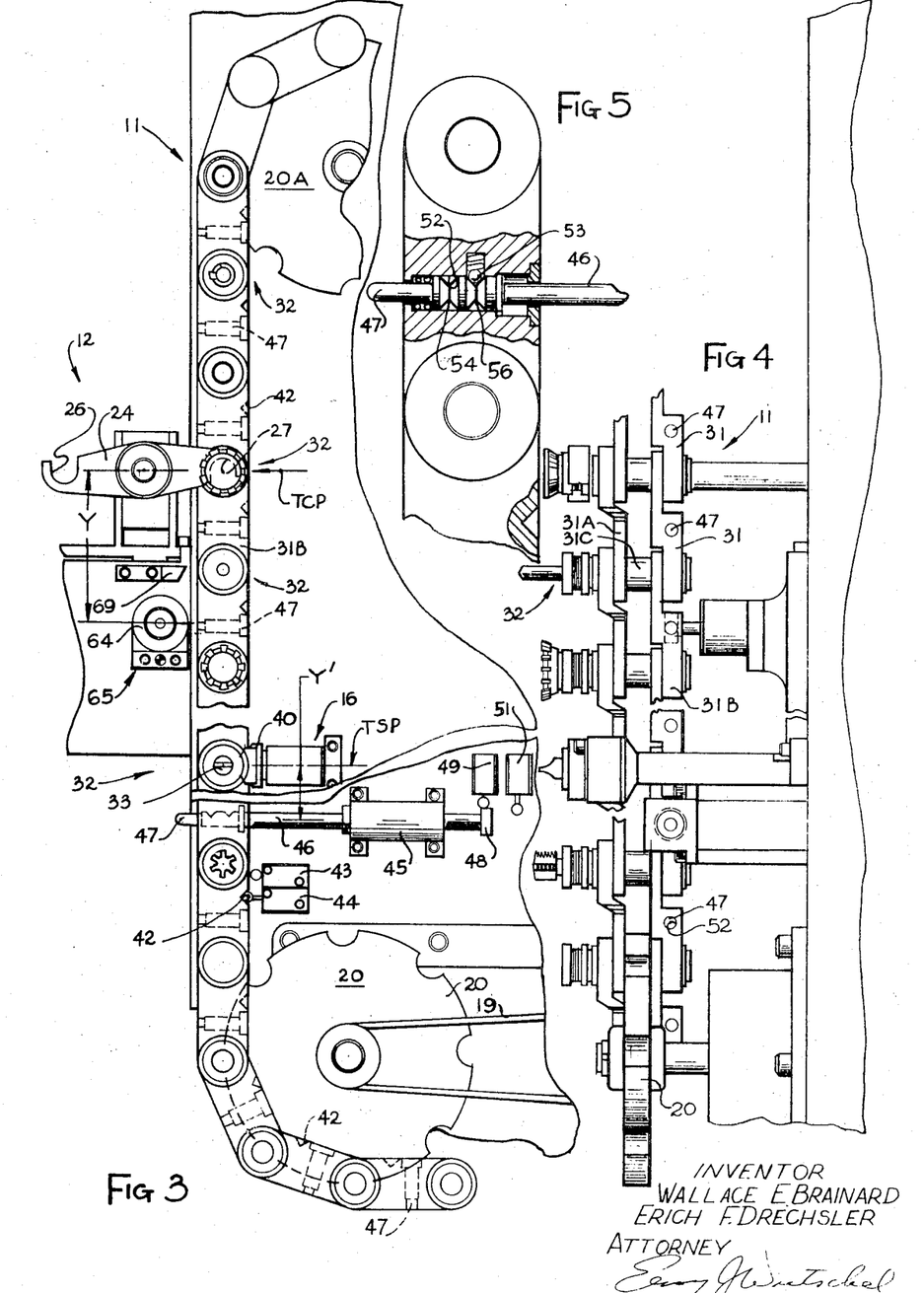
FIG. 3 is a fragmentary view of the tool change storage magazine showing its relationship to the tool changer and the tool selecting locations together with details of the mechanism that stops the chain when a selected tool reaches a position of interchange.
FIG. 4 is a fragmentary side view of the tool change mechanism of FIG. 3.
FIG. 5 is an enlarged fragmentary view showing details of plunger 44.

THe tool changer 12 is carried by the spindlehead 6 for movement with the head. Thus, at the end of a particular machining operation the spindlehead 6 will be located in a vertical position which is determined by the last programmed vertical work position of the spindlehead 6. As a result, at each tool change cycle the tool changer 12 will be located vertically a different distance relative to the tool select position identified as ISP. It is, therefore, necessary to initiate the movement of the chain magazine to move the tool storage socket in which the desired selected tool is stored into a tool change position TCP indicated by the arrow, FIG. 3, which position is directly opposite the tool change arm 24, as depicted in FIG. 3. To effect such movement of the chain magazine after the last machining operation has been completed, a signal will be obtained from the tape 15 to initiate the operation of the motor 18 to move the selected tool from the tool select position ISP to the transitional tool change position TCP. With the selected desired tool positioned at the transitional tool change position TCP, the operation of the motor 18 will again be discontinued locating the selected tool in the transitional tool change position TCP where it will be engaged by the tool change arm 24.

Figures 6, 8, 9:
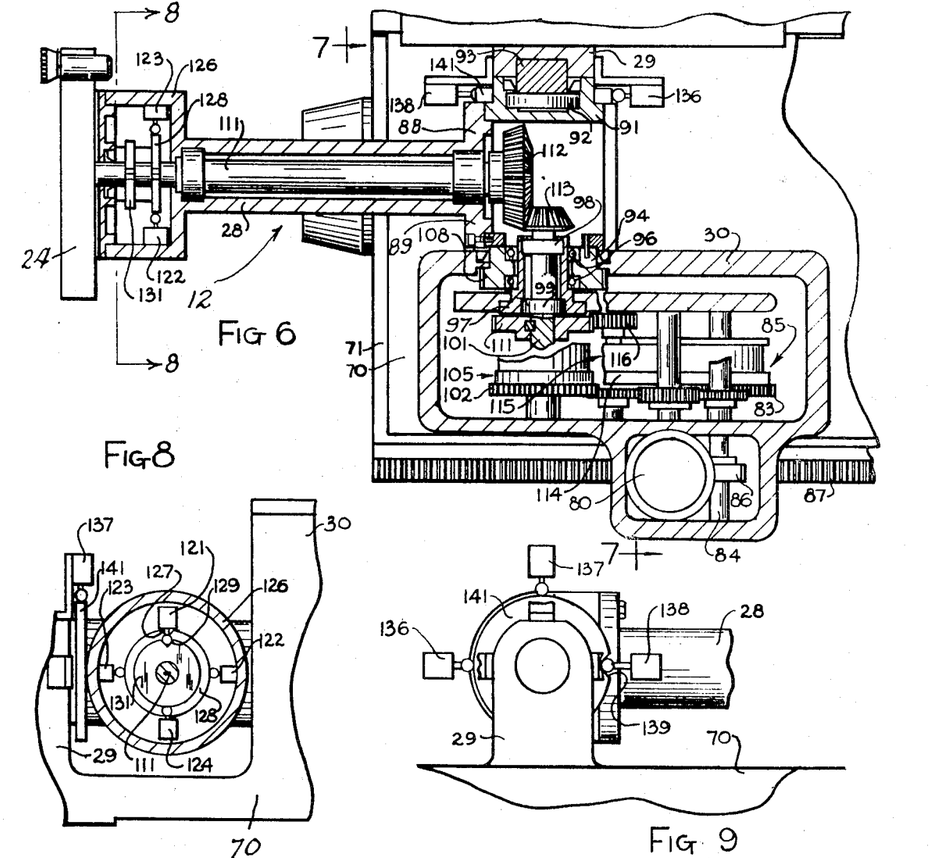
FIG. 6 is an enlarged fragmentary view in horizontal section taken through the tool-change transmission housing and showing the clutches and gears for effecting the various movements of the mechanism.
FIG. 8 is a fragmentary view in vertical section taken through the tubular supporting shaft along the plane represented by the line 8-8 in FIG. 6, showing the control limit switches for the various rotary positions of the tool change arm.
FIG. 9 is an enlarged side view of the trunnion support for the tubular supporting shaft showing the control limit switches for the three basic positions of the tubular shaft.

As represented in FIGS. 3 and 6, the tool change arm 24 is an integral unit pivotally supported on the extending end of a tubular shaft 28 and is provided with tool carriers, grips, or sockets 26 and 27 at each end. The tubular shaft 28, FIGS. 1, 6. 7, 8 and 10, in turn is supported for pivotal movement in bearings suitably disposed in the housing 30 and an upright 29 both of which are carried on the top surface of a slide 70 that slides along the top of the spindlehead 6. Generally speaking and as will be more fully set forth hereinafter, the tool change arm 24 pivots from a vertical inoperative position in a clockwise direction, as viewed in FIG. 3, to engage the grip 27 with a selected tool 32 in the magazine socket, thereafter the rod 28 pivots to a vertical position, then the transmission housing 30 slides to the left, as viewed in FIG. 1, to a forward spindle position. Thereafter shaft 28 pivots downwardly and the tool change arm 24 pivots in a counterclockwise direction, as viewed from the left FIG. 1, to engage its empty socket with the tool 13 in the spindle. Thereafter, the spindle collect mechanism (not shown) will be operated to release the tool 13 in the spindle in a well-known manner, so that he previously used tool may be withdrawn from the spindle. The tool changer 12 is then operated to withdraw the tool from the spindle and rotate to interchange the positions of the tools so that the selected tool is positioned in axial alignment with the spindle. Thereafter the tool changer 12 operates to insert the desired tool in the spindle, disengaging the arm 24 from the tool. The transmission housing 30 is then operated to move to the magazine position at the rear of column 5 to return the previously used tool to storage in the magazine 11.

Since the chain magazine 11 is constructed to hold a great number of tools, which could be heavy tools, and the spindlehead in itself is of massive construction the spindlehead and the magazine have been independently mounted and there has been provided a tool selection arrangement wherein a tool next to be used by the spindle in the spindlehead will be selected prior to the spindle finishing the work operation with the new tool. That is, the tool selection is accomplished during the work operation. However, when tool change is to be effected, rather than moving the spindle to a home position in a vertical plane adjacent to the selected tool, the magazine or chain is moved so that the selected tool is positioned in a transitional tool change position TCP adjacent to the tool change arm 24 on the spindlehead 6 wherever it may have been stopped in accordance with the last machining programmed command.

As best shown in FIG. 4, the magazine is made of a plurality of links 31, each link comprising a front member 31A and a rear member 31B which are pivotally engaged in spaced relationship on a tubular pivot pin 31C. Each tubular pivot pin 31C also serves as a storage socket in which tools are disposed for subsequent selection and use in the spindle. The chain magazine is trained around sprockets 20, 20A, 20B and 20C, which are rotatably supported on the rear surface of the vertical column 5 of the machine. As previously mentioned, the sprocket 20 is driven by the belt 19 and motor 18 as aforesaid. Stored in the chain magazine 11 are a plurality of different tools generally indicated by the reference number 32. The tools stored in the magazine 11 are moved past the reader 16 having a plurality of sensing fingers 40, which fingers sense the codes of the tool and actuate the reader 16 to send code signals to the electrical control such as the coincident circuit as shown by the aforesaid Brainard patent. When coincidence exists between the code commanded by the tape and code read by the tool, motor 18 will stop and this will stop the chain; however, the momentum of the drive may take the selected tool past the reading head slightly. In this condition of overtravel, a limit switch actuating notch 42 on the chain associated with the selected tool will engage and actuate a limit switch 43 which will effect the reverse operation of the motor 18 to move the chain magazine in the reverse direction until the notch 42 actuates the limit switch 44 and this will stop the selected tool in proper position with respect to the reading head 16 accurately locating the selected tool in the tool select position TSP, as depicted in FIG. 3. Limit switch 44, when actuated, will also energize solenoid 45 to move its associated plunger 46 outwardly to engage and push a feeler plunger 47 outwardly with its leading end extending past the chain. With the feeler plunger 47 actuated leftwardly as viewed in FIG. 3, a dog 48 on the opposite end of the solenoid plunger 46 will be moved into position to engage and actuate a switch 49. With the switch 49 actuated, the solenoid 45 will be deenergized and the solenoid will be spring returned to a retracted position leaving the feeler plunger 47 in an extended outward position as shown in FIG. 3. With the plunger 46 in retracted position, the dog 48 will be moved out of engagement with the limit switch 49 and will be moved into actuating engagement with the switch 51 to provide a signal in the controlled circuit to indicate a satisfied condition which will be utilized later. Each tool storage position in the chain will have its associated plunger 47 located in a fixed position with respect to the axis of the socket with which it is associated. FIG. 5 illustrates a detail of a plunger 47 and as there shown it is disposed in a bore 52 of a chain link and is held in either one of two positions by a spring ball detent mechanism 53 engageable in one or the other of annular grooves 54 and 56.

When a machining operation with one tool has been finished, the spindlehead will have stopped at the last vertical work position and the tape will call for an interchange which will start motor 18 to operate the chain magazine to move the selected tool 33, FIG. 3, vertically from the tool select position TSP towards the spindlehead. This movement of the tool magazine 11 will continue until the outwardly extending end of the feeler plunger 47 engages a roller 64 on the actuating lever of a switch mechanism 65 on the spindlehead to stop the chain motor 18 and position the selected tool in the tool change position TCP in a position to be picked up by the tool changer arm 24. The tool change position TCP as previously mentioned will be any vertical position which is the last vertical work position of the spindlehead. Therefore, as the motor 18 operates to drive the chain in its path of travel to move the selected tool such as the tool 32 with the cutter 33 (shown in FIG. 3) from the tool select position TSP into the tool change position TCP, the notch 42 will move out of engagement with the actuating plunger of the limit switch 44 and will, in passing the limit switch 43, and 44 have no affect switch 43, actuate that switch. However, at this time, the limit switches 43 and 44 have no effect on the control circuit as such. The chain will thereby continue to move until the extended plunger 47 actuates 65 that is carried on the spindlehead. When the plunger 47 is moved into position to engage the control switch 65 it will actuate the switch, and at this movement, the selected tool 32 with the cutter 33 will be positioned in the tool change position TCP opposite the tool change arm 24. As is shown in FIG. 3, the distance between the center of the switch 65 and the axis about which the arm 24 rotates is equal to the distance between the axis of the actuating plunger 47 and the axis of a storage position two places removed from the plunger 47 which actuates the switch 65. Or, as expressed in another manner, the distance between a horizontal line passing through the axis of rotation of the tool change arm 24 and a horizontal line passing through the axis of the control switch 65, which distance is indicated in FIG. 3 as being a distance Y, is equal to a distance Y' which is the distance between a horizontal line passing through the center of the reader 16 and the axis of a tool 32, and a horizontal line passing through the axis of the actuating plunger 47. When the chain has moved upward a sufficient distance so that the selected tool 32 with the cutter 33, which has been selected for the next tool to be placed in the spindle, is opposite the tool change arm 24 the outwardly positioned plunger 47 will be positioned to engage the switch 65 thereby stopping the operation of the motor 18 so that chain movement is stopped, with the selected tool being located in the tool change position TCP. At this time, a signal will be obtained from the tape to effect the operation of the tool change mechanism 12 to remove the selected tool 32 from the storage position in the chain at the tool change position and interchange it with the previous tool 13 used in the spindle. After a tool interchange operation has been completed and the machine starts machining with the new tool, the tape will call for another tool select cycle and start the chain to move. At this time the plunger 47 is still extended. However, as the plunger 47 moves upwardly, it will engage a cam 69 and thus be moved into its proper inactive position in the chain. During this movement of tool identification and selection the switches 43 and 44 will have no effect on the controlled circuit as they are not connected in the circuit at such time.

Figure 7:
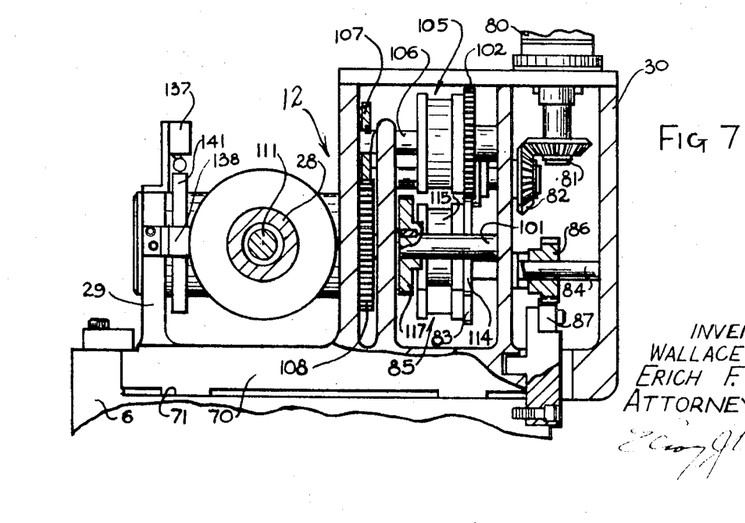
FIG. 7 is a view in transverse section through the tool change transmission mechanism taken along the plane represented by the line 7-7 in FIG. 6.

Within the housing 30 which is slidably mounted on top of the spindlehead 6, is a transmission mechanism that operates the tool change arm shaft 28 and the arm 24. The housing 30, as previously mentioned is supported for slidable movement on the top surface 71 of the spindlehead, as shown in FIGS. 6 and 7, which movement serves to carry the tool change arm 24 from a rearward position adjacent the storage magazine 11, as depicted in FIG. 1, to a forward tool interchange position, as depicted in FIG. 6, wherein it will be positioned adjacent the spindle. To effect such movement of the housing 30 power is obtained from a motor 80, mounted on the top of the transmission housing 30 and is transmitted to a bevelled gear 81 and then to a mesh bevelled gear 82. The power is transmitted via appropriate intermeshed gearing to a clutch gear 83. When the clutch mechanism 85 is actuated, the clutch gear 83 will be coupled to the driver of the clutch mechanism 85, and will operate to rotate a shaft 84 having a drive pinion 86 which is disposed in meshing engagement with a rack 87. Thus, depending upon the direction of the operation of the motor 80, the transmission housing 30 and thereby the tool change mechanism 12 will be moved over the slide surface 71 to effect the movement of the arm 24 in one direction or another.

As stated above, the arm 24 on the tubular shaft 28, must be swung to a rearward-facing position when the housing 30 is at the rear position, shown in FIG. 1, and must be swung to a vertical position as the housing is moved to the forward tool interchange position and then the tubular shaft 28 must be swung to a horizontal forwardly extending position so as to locate the tool change arm 24 adjacent to the spindle for a tool interchange operation. To this end, the inner end of the tubular shaft 28 is provided with laterally extending bosses 88 and 89. The boss 88 is provided with a circular retainer 91 which is secured within the boss 88 and receives a bearing 92 which, in turn, is supported on a horizontal extending stub shaft 93 carried by the upright 29. On the other hand, the boss 89 is provided with a bearing retainer 94 which is secured within the boss 89 to rotate with it. The bearing retainer 94 receives a pair of antifriction bearings 96 in which a sleeve member 97 is journaled. The sleeve member 97, in turn, is provided with space bearings 98 and 99 for rotatably supporting a power transmission shaft 101. To effect the pivotal movement of the tubular supporting shaft 28 for locating the tool change arm 24 either in a forward or rearward direction, power is transmitted from the motor 80 to the bevelled gears 81 and 82, as previously described. The power is transmitted from the bevel gear 82 through suitable intermeshed gearing to a clutch gear 102 of a clutch mechanism 105. When the clutch mechanism 105 is engaged, the clutch gear 102 will be coupled to drive the clutch shaft 106 which has a gear 107, FIG. 7, keyed thereto. The power will be transmitted from the gear 107 to a gear 108 formed on the inner end of the bearing retainer 94. Since the retainer 94 is secured in the boss 88, the drive to the gear 108 will effect the pivotal movement of the tool arm shaft 28 in one direction or the other depending upon the direction of rotation of the motor 80.

With the tubular shaft 28 swung to its rearwardly extending position, the tool change arm 24 has to be rotated to horizontal position to engage its tool grip 27 with the selected tool 32 in the tool change position TCP, as shown in FIG. 3. On the other hand when the transmission housing 30 is in a forward position adjacent the spindle and the tubular arm 28 is in a forwardly extending tool interchange position, the tool changer arm 24 has to be swung from a horizontal to a vertical position to engage the empty socket 26 with the previously used tool in the spindle. After the previously used tool has been withdrawn from the spindle the arm 24 must be rotated 180° to position the selected new tool in coaxial alignment with the spindle for insertion into the spindle. To this end, the tool change arm 24 is mounted on the extending end of a rotatably supported drive shaft 111 that extends through the tubular shaft 28. The inwardly extending end of the drive shaft 111 is provided with a bevel gear 112 which is disposed in meshing engagement with a bevel gear 113 that is secured on the end of the shaft 101. To rotate the tool change arm 24 independently of the tool arm support shaft 28, power from the motor 80 is transmitted via the bevelled gears 81 and 82 and thence via suitable meshed gearing to a clutch gear 114 of the clutch mechanism 115. When the clutch mechanism 115 is engaged, the clutch gear 114 will be operative to effect the rotation of the gear 116, FIG. 6, which, in turn, will drive a gear 117 with which it is meshed. The gear 117 is secured on the shaft 101 previously mentioned. Thus, the rotation of the gear 117 will effect rotation of the gear 113 and rotative power will be transmitted to the bevel gear 112 to rotate the drive shaft 111, which, in turn, will effect the rotational movement of the arm 24 in a direction established by the operation of the motor 80.

The various angular positions of the tool change arm 24 are indicated by the switches 121, 122, 123 and 124, as shown in FIGS. 6 and 8. As shown in FIG. 6, the limit switches are mounted within an enlarged head portion 126 of the tubular shaft 28 with the limit switches 122 and 123 being disposed 180° apart to be actuated by means of a notch 127 formed in the periphery of the cam 128 that is mounted to rotate with the shaft 111. The limit switches 121 and 124 are also mounted in the enlarged head portion 126 of the tubular shaft 28 and are angularly disposed 90° with respect to the limit switches 122 and 123 and therefore do not appear in FIG. 6 but are depicted in FIG. 8. The switches 121 and 124 are disposed to be actuated by a notch 129 in a cam 131 which is likewise secured to the shaft 111 for rotation with the shaft.

The shaft 28 has three basic positions, that is, either it is in a horizontal position wherein it extends rearwardly to present the tool change arm 24 adjacent the chain storage magazine, or it is in a vertical position in which position it is carried while the transmission housing 30 is being moved along the slideway 71, or it is in a horizontal forward position in which the tool change arm 24 is presented adjacent the spindle. These three positions of the arm are indicated by means of three limit switches 136, 137 and 138 shown in FIGS. 6, 7 and 9. When the arm is in a forward horizontal position as depicted in FIG. 6, the limit switch 138 will be actuated by a notch 139 formed in the periphery of the cam member 141 which is mounted about the retainer 91 that is secured in the boss 88 of the shaft 28 and therefore will rotate with the shaft. When the shaft 28 is in the upright or vertical position, the notch 139 will be positioned to actuate the limit switch 137. On the other hand, when the shaft 28 is in horizontal rearward position, the notch 139 will be positioned to actuate the limit switch 136.

As previously mentioned, the transmission housing 30 has two basic positions; a forward or spindle position wherein the tool change arm 24 is located adjacent the spindle; and, a rearward or magazine position wherein the tool change arm 24 is adjacent the chain magazine 11. In the forward spindle position the housing 30 has an advance position indicated by the actuation of a switch 146, FIG. 10F, wherein the tool change arm 24 is moved to withdraw a tool from the spindle and in the advanced position the arm 24 may be rotated 180° to locate a selected tool in coaxial alignment with the spindle for insertion into the spindle; in a forward spindle retract position indicated by the actuation of a switch 147, FIG. 10H, the arm 24 is moved to insert a tool into the spindle. A similar arrangement is provided for the rearward magazine position of the transmission housing 30. In the rearward magazine position the transmission housing 30 has an advanced position indicated by the actuation of switch 148, FIG. 10, wherein the tool change arm 24 is moved to withdraw a selected tool from the magazine and in the rearward magazine advanced position the arm 24 may be rotated to locate the previously used tool withdrawn from the spindle in coaxial alignment with a storage socket of the magazine. On the other hand the transmission housing 30 has a rearward magazine retracted position, which position is indicted by actuation of the switch 149, FIG. 10M, in which position the arm 24 may be rotated to engage a selected new tool in the magazine or operated to insert the previously used tool into a storage position in the magazine.

Figures 10, 10A:
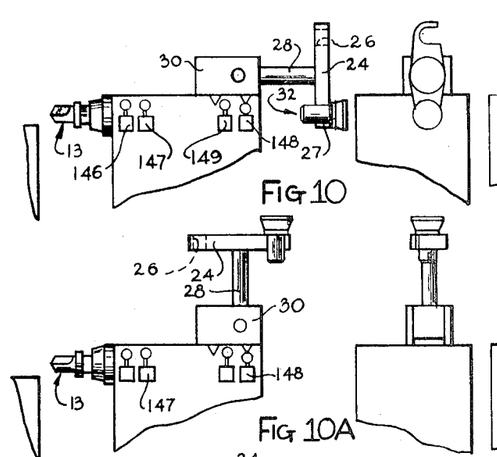
FIGS. 10 to 10R are diagrammatic views showing the various positions of the tool change arm and transmission housing in a tool change cycle of operation.
Figure 10:
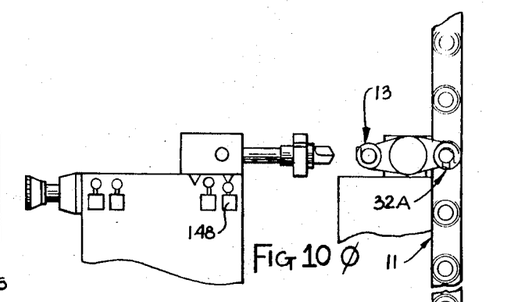
Figures 10B, 10G:
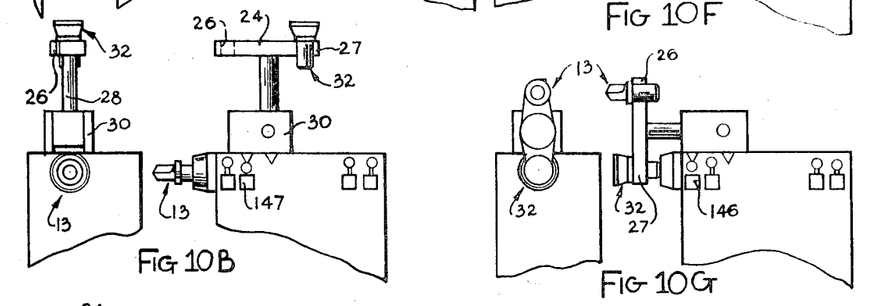
Figure 10C:
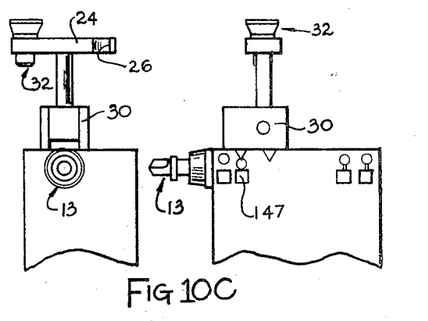
Figure 10D:
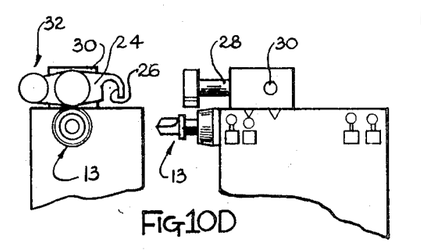
Figures 10E, 10F:
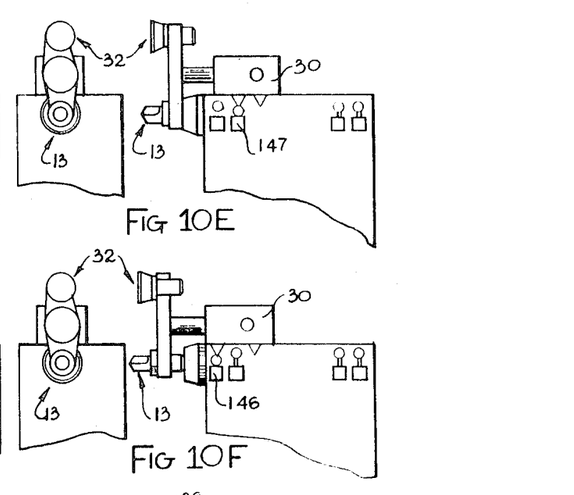
Figure 10H:
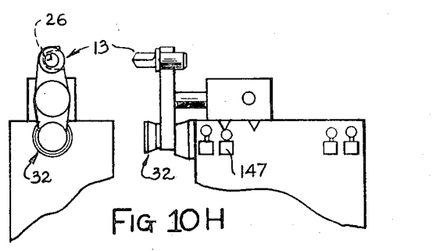
Figure 10I:
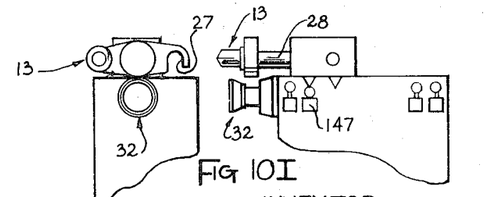
Figure 10J:
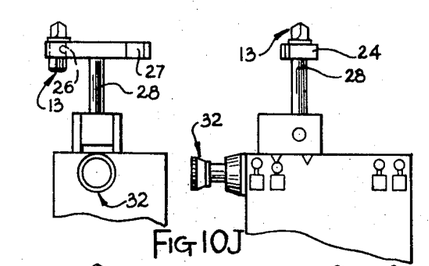
Figure 10K:
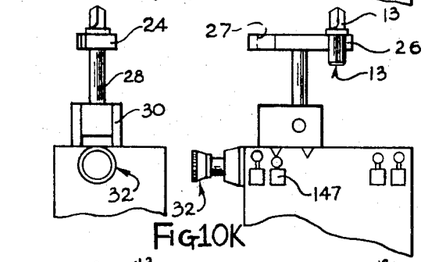
Figures 10L, 10M, 10Q, 10R:
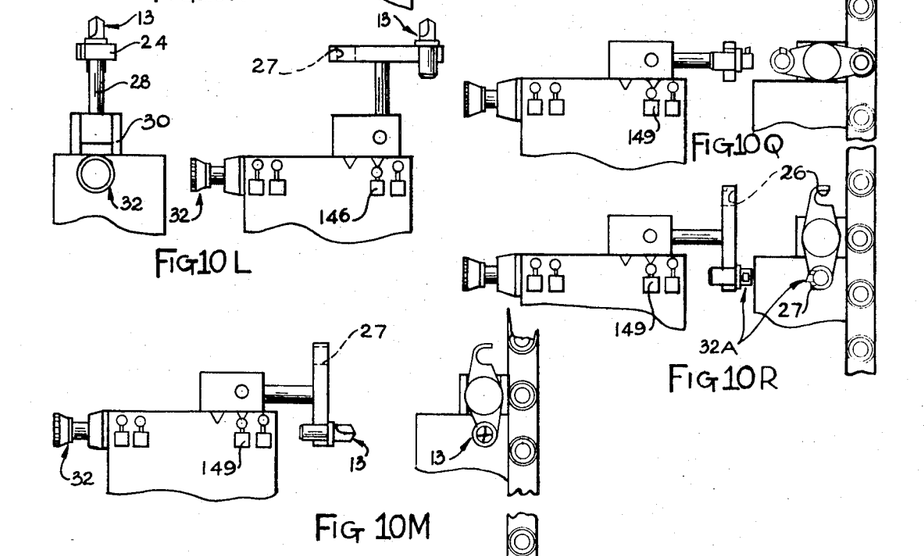
Figure 10N:
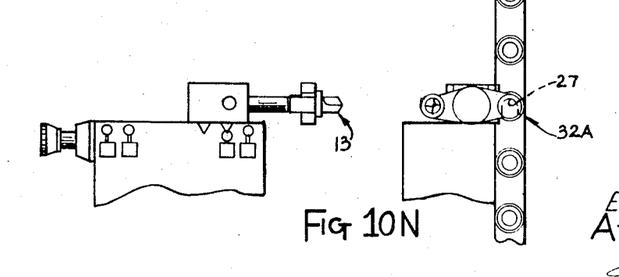

A description of tool change cycle of operation will be described in conjunction with FIGS. 10 to 10R, inclusive, wherein the various positions of the tool change arm 24 and transmission housing 30 are shown diagrammatically. In describing the tool change cycle of operation, it will be assumed that the various mechanisms are in the condition depicted in FIG. 10, wherein the transmission housing 30 is in an advanced rearward magazine position; that the tool change arm 24 has been operated so as to withdraw a tool from the storage chain and has been rotated into the vertical position in which the grip 26 is in the uppermost position, while the grip 27, on the opposite side of the arm, with the tool 32 therein is a lowermost position. Under these conditions, the cam member 128, as shown in FIG. 8, will be in position wherein the notch 127 is positioned to receive the actuating plunger of the switch 122 thereby actuating the switch. Also, with the shaft 28 in the horizontal rearward position, the cam 141, as shown in FIG. 9, will be positioned so that its associated notch 139 will be in a position to receive the actuating plunger of the switch 136 thereby actuating the switch. With these conditions obtained, the signal from the tape will effect the operation of the clutch mechanism 105 and the energization of the motor 80 so that the motor is connected to effect the pivotal movement of the shaft 28 from the rearward magazine position, shown in FIG. 10, to a vertical position shown in FIG. 10A. When the shaft 28 is in the vertical plane, the switch 137 will be actuated and will operate to effect the disengagement of the clutch mechanism 105 thereby disconnecting the motor 80 from the shaft 28. Simultaneously therewith the clutch mechanism 85 will be operated to connect the motor 80 to the pinion 86 for effecting the movement of the transmission housing 30 along the slideways 71 from its advanced rearward magazine position depicted in FIG. 10A, to a forward spindle retracted position as depicted in FIG. 10B. At this time, a switch 147 will be actuated to effect disengagement of the clutch mechanism 85, and to effect the energization of the clutch mechanism 115 so as to connect the motor 80 to the drive shaft 111 for effecting the rotation of the arm 24, 90° from the position it occupies in FIG. 10B to a sidewise position as depicted in FIG. 10C. The rotation of the arm 24 into the position it occupies as depicted in FIG. 10C will actuate the switch 121. FIG. 8, to deenergize the clutch mechanism 115 and to effect the energization of the clutch mechanism 105 and the energization of motor 80 for operation in a direction to effect the pivotal movement of the shaft 28 from the vertical position it occupies in FIG. 10C, to a horizontal position as depicted in FIG. 10D. With the shaft 28 in a horizontal position, switch 138, shown in FIG. 9, will be actuated to effect the deenergization of the clutch mechanism 105. The actuated switch 138 will also operate to effect the energization of clutch mechanism 115 and to reenergize the motor 80 to operate it in a direction so as to rotate the arm 24 90° in a clockwise rotation as viewed in FIG. 10D, which will serve to engage the empty grip 26 of the arm 24 on the previously used tool 13 in the spindle. Upon the completion of such movement, the switch 122 shown in FIG. 8, will be actuated to effect the deenergization of the clutch mechanism 115 and effect the energization of the clutch mechanism 85 and reconnect the motor 80 for operation in a direction to move the transmission housing 30 from the retracted forward spindle position, that it occupies in FIG. 10E, to an advanced forward spindle position, depicted in FIG. 10F. The movement of of the transmission housing 30 from the retracted forward position, depicted in FIG. 10E to the advanced forward position depicted in FIG. 10F will serve to withdraw the previously used tool 13 from the spindle, as illustrated in FIG. 10F. With the transmission housing in the advanced forward spindle position, the switch 146 will be actuated to effect the deenergization of the clutch mechanism 85 as well as to effect energization of clutch mechanism 115, and to reconnect the motor 80 so that it will operate in a direction to effect the rotation of the tool change arm 24, 180° in a clockwise direction as viewed in FIG. 10F. This operation will serve to position the new tool 32, carried in the grip 27 on the arm in axial alignment with the axis of the spindle. With this condition obtained the switch 123, shown in FIG. 8, will be actuated to effect the deenergization of the clutch mechanism 115 as well as to effect the energization of the clutch mechanism 85 and reconnect the motor 80 for operation in a direction to effect the movement of the transmission housing 30 from the advanced forward spindle position that it occupies as depicted in FIG. 10G and move it rightwardly to a retracted forward spindle position shown in FIG. 10H thereby inserting the tool 32 into the spindle. With the transmission housing 30 in retracted forward spindle position, switch 147 will be actuated to effect the deenergization of the clutch mechanism 85; to actuate clutch mechanism 115, as well as, to reconnect the motor 80 for operation in a direction of effecting the counterclockwise rotation of the arm 24 from the vertical position it occupies in FIG. 10H to a horizontal position shown in FIG. 10I. The 90° rotation of the arm 24 in counterclockwise direction will serve to disengage the grip 27 from the tool 32, leaving the tool 32 in operative engagement in the spindle. At this time the collet mechanism (not shown) will be operated in a well-known manner to secure the tool in the spindle. With the arm 24 in a horizontal position, the switch 124 will be actuated to effect deenergization of clutch mechanism 115; energization of the clutch mechanism 105, and to energize the motor 80 for operation in the direction to pivot the shaft 28 upwardly from the forward horizontal position shown in FIG. 10I into a vertical position as depicted in FIG. 10J. With the shaft 28 in a vertical position, switch 137 will be actuated and will operate to effect the deenergization of the clutch mechanism 105 as well as to effect the energization of the clutch mechanism 115 and to reconnect the motor 80 for operation in a direction to effect the rotation of the arm 24 from the position occupied in FIG. 10J into position it occupies in FIG. 10K. With the arm parallel with the axis of the head 6, the switch 123 will be actuated to effect the deenergization of the clutch mechanism 115 as well as to effect the energization of the clutch mechanism 85 and to reconnect the motor 80 for operation in the direction to move the transmission housing 30 from the retracted forward position it occupies as depicted in FIG. 10K to the retracted rearward position, depicted in FIG. 10L. With the transmission housing 30 in the retracted rearward position, the switch 146 is actuated to effect the deenergization of the clutch mechanism 85 as well as to effect the energization of the clutch mechanism 105 and to reconnect the motor 80 for operation in a direction to effect the pivotal movement of the shaft 28 from the vertical position into a horizontal rearwardly extending position as depicted in FIG. 10M. Upon reaching this position, switch 136 will be actuated to effect the deenergization of the clutch mechanism 105 as well as to effect the energization of the clutch mechanism 115 and to reconnect the motor for operation in a direction to effect the rotation of the arm 24 in a clockwise direction as viewed in FIG. 10M, to position the arm 24 from the vertical position into a horizontal position as shown in FIG. 10N. With the arm 24 in a horizontal position, the switch 121 will be actuated.

At this point, it is well to note a few existing operational conditions. During the previous machining operation, before the spindlehead has stopped in the position depicted in FIGS. 10 to 10R, a tool selection has been made by operation of the tape control mechanism to activate the tool storage magazine 11, reading the tool codes, and selecting the tool designated by the tape, which tool will stop at the location of the reading head 16 and wait for a further command operation. It is to be understood of course, that if desired, tool selection could be made during the earlier part of the tool transfer as illustrated above. In either event, when the head 6 stops in vertical position of its final machining operation, which is depicted in FIGS. 10 to 10R, a signal from the tape will start the tool storage magazine motor 18 to move the tool from the tool select position TSP adjacent the reading head 16 to a tool change position TCP adjacent the spindlehead as determined by the switch mechanisms 65 and, in such position, the new tool is in position to be picked up by the tool changer.

Figure 10P:
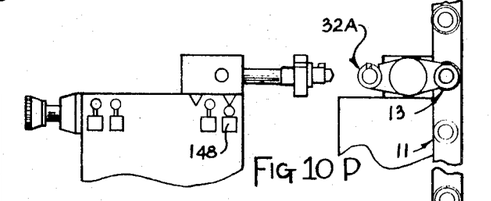

Thus, when switch 136 was actuated and the arm 24 is rotated in a clockwise direction, as stated above, the now empty grip 27 of the arm 24 will be moved into engagement with a newly selected tool 32A positioned adjacent the spindlehead. As stated above, with the arm 24 rotated 90° from the position depicted in FIG. 10M into the position depicted in FIG. 10N the switch 121 is actuated and operates to effect the deenergization of the clutch mechanism 115, effect the energization of the clutch mechanism 85, and to reconnect the motor 80 for operation in a direction to move the transmission housing 30 from its retracted rearward position, depicted in FIG. 10N into the advance rearward position as shown in FIG. 10O. With this condition obtained the tool change arm 24 will move relative to the chain storage magazine 11 to withdraw the tool 32A out of the magazine. With the transmission mechanism 30 in its advance rearward position, the switch 148 will be actuated to effect the deenergization of the clutch mechanism 85, effect the energization of the clutch mechanism 115 and to reconnect the motor 80 for operation in a direction for effecting the rotation of the arm 24 in a clockwise direction 180°. In this operation, the arm 24 will be moved from the position it occupies in FIG. 10O to the position shown in FIG. 10P. With this rotation of the arm, the previously used tool 13 in the grip 26 of the arm 24 will be positioned in axial alignment with the storage socket of the chain storage magazine from whence the tool 32A was withdrawn for insertion therein. With the arm rotated 180° in a clockwise direction into the position depicted in FIG. 10P the switch 124 will be actuated to effect the deenergization of the clutch mechanism 115, effect the energization of clutch mechanism 85 and to reconnect he motor 80 for operation in the direction to effect the movement of the transmission housing 30 from its forward rearward position shown in FIG. 10P into its retracted rearward position depicted in FIG. 10Q. With this movement, the transfer arm 24 moves towards the chain storage magazine and inserts the previously used tool 13 into the storage position in the chain magazine 11. Upon reaching the retracted rearward position, switch 149 will be actuated to deenergize clutch 85, effect energization of the clutch mechanism 105 and to reconnect the motor 80 for operation in a direction to effect the pivotal movement of the arm 24 in a counterclockwise direction 90° as viewed in FIG. 10Q so as to position the arm in a vertical position as shown in FIG. 10R. At the end of such rotation, the switch 122 will be actuated to effect the deenergization of the clutch mechanism 105 and to deenergize the motor 80. In this condition, the new tool 32A will be in the grip 27 while the grip 26 will be empty and ready for the next tool-changing cycle of operation at the end of the counterclockwise machine operation with tool 32 which is in the spindle.

It will be seen that at the beginning of a cycle of machining operation, a tool has been placed in the spindle of the machine for such operation and the next tool to be used is already in the tool changer grip for interchange at the end of the cycle of machining operation.

Since the details of the control system per se are not a part of the invention, they need not be illustrated herein since such a control would be obvious and particularly in view of a reference to the Brainard U.S. Re. Pat. No. 25,737. Although the above illustration represented in FIGS. 10 to 10R gives one mode of operating the mechanism, it is apparent that other modes of operation are equally as feasible. As another illustration, the new tool could be selected while the machining is going on with the tool being used and the new tool could remain adjacent the reading head until the completion of the machining operation so that, upon completion of the machining operation, the new tool can be moved up to a point adjacent the spindlehead's last stop and be ready for a tool exchange. In this exchange operation, the tool changer will pick up the new tool from the magazine, move to the spindle and exchange the new tool with the used tool in the spindle and then return to its inoperative position. When an interchange starts with a used tool in the tool changer, the first step is to exchange such tools with the selected tool in the magazine.

Although the illustrative embodiment of the invention has been described in considerable detail for the purpose of disclosing a practical operative structure whereby the invention the be practiced advantageously, it is to be understood that the particular apparatus described is intended to be illustrative only and that the novel characteristics of the invention may be incorporated in other structural forms without departing from the spirit and scope of the invention as defined in the subjoined claims.

The principles of this invention having now been fully explained in connection with the foregoing description, we hereby claim as our invention:

1. In a machine tool;
   a movable tool storage magazine having a plurality of diverse tools removably carried therein;
   a spindlehead carrying a tool-receiving spindle, said spindlehead being supported for movement along at least one path of travel;
   power drive means operably connected to move said magazine;
   means operably connected to control the operation of said power drive means for moving said magazine with respect to said spindlehead along the path of travel of said spindlehead from a tool select position a variable distance as established by the position of said spindlehead to locate the selected tool in a tool change position relative to said spindlehead; and,
   tool change means operable to interchange the selected tool from said magazine with the previously used tool from said spindle.

2. A machine tool according to claim 1 including means operative at the tool select position to identify and select a desired tool for the next machining cycle while said spindle is performing a machining cycle on a workpiece; and,
   wherein said means to control the operation of said power drive means is activated after the completion of a machining cycle so that the desired selected tool is moved to said spindlehead for transfer to said spindle.

3. A machine tool according to claim 2 including a plunger associated with each storage position in said magazine, said plungers being normally disposed in an inoperative position and movable to an operative position; and, said means to control the operation of said power drive means includes a control positioned to be actuated by a plunger associated with a storage position in said magazine which is in an operative position to stop said power drive means so that the tool stored in the storage position associated with the plunger which actuated said control is located in a position to be transferred from said magazine to the spindle.

4. A machine tool according to claim 3 including means activated by said tool identifying and selection means to move the plunger associated with the storage position in which the selected desired tool is stored into its operative position.

5. A machine tool according to claim 4 including means operable to move a plunger from its operative position to its normal inoperative position as said magazine is actuated in a tool selecting movement.

6. In a machine tool having a column on which a spindlehead is supported for movement;

a power-driven spindle operatively carried by the spindlehead, said spindle having an operating end adapted to receive tools for performing work operations;

a tool storage magazine disposed at the rear of the column free of the spindlehead in a position remote from the operating end of the spindle, said magazine having a plurality of tool storage sockets in which tools are stored operably carried for movement in a path of travel in a plane which is perpendicular to the axis of the spindle;

power means connected to move said tool storage sockets in their path of travel;

control means operably connected to regulate the operation of said power means;

tool selection means operable to select the next desired tool for utilization in the spindle, said tool selection means being operable to effect the operation of said control means for regulating said power means for stopping the movement of the tool storage socket having the next desired tool therein at the tool select position until such time as the spindle is positioned in its last work operation;

means responsive to a signal from recorded data to effect the operation of said control means to regulate said power means to move the tool storage socket with the next desired tool stored therein from the tool select position to the tool transfer position defined by the last work position in the spindle; and, a tool change device supported by the spindlehead for movement in a direction parallel to the axis of the spindle for transferring a next desired tool from the storage socket located at the tool transfer position to the spindle and transferring the previously used tool form the spindle to the magazine for storage.

7. A machine tool according to claim 6 wherein there is provided mans operable upon the arrival of the tool storage socket in which the next desired tool is stored to effect the operation of said control means to regulate said power means to locate and stop the tool socket with the next desired tool at the tool transfer position.

8. A machine tool according to claim 7 wherein a plunger is mounted in said magazine adjacent to each tool storage socket;

and there is provided an actuator operable in response to a tool socket in which the next desired tool is located being located at the select position to move the plunger associated with socket in which the next desired tool is stored to an operative position;

signal-producing means carried by the spindle in position to be actuated by a plunger in operative position to effect the operation of said control means to regulate the power means for locating and stopping the storage socket with the next desired tool at the tool transfer position; and, means on said spindlehead in position to engage and return an extended plunger to an inoperative position.

9. A machine tool according to claim 6 wherein said tool change member comprising a carrier is supported on the spindlehead for movement between a forward position adjacent the operating end of the spindle and a rearward position adjacent the storage magazine;

a supporting shaft carried by said carrier for bodily movement with said carrier and for independent pivotal movement from a forward-extending position to a rearwardly extending position; and, a tool change arm having tool grips on each end for engaging and holding a tool, said arm being operably carried by said shaft for movement with it and for independent rotary movement relative thereto into and out of engagement with a tool in a storage socket at the tool transfer position or into and out of engagement with a tool in the spindle.

10. A machine tool according to claim 9 wherein there is provided:

a drive transmission carried by said carrier, said transmission being operable to effect the bodily movement of said carrier, the pivotal movement of said shaft, and the rotary movement of said arm selectively; and, power means operatively connected to operate said transmission.

UNITED STATES PATENT OFFICE
CERTIFICATE OF CORRECTION

Patent No. 3,591,920　　　　　　　　　　Dated July 13, 1971

Inventor(s) Wallace E. Brainard et al.

It is certified that error appears in the above-identified patent and that said Letters Patent are hereby corrected as shown below:

Column 1, line 60, "step" should read -- stop --. Column 3, line 1, "THe" should read -- The --; lines 8 and 17, "ISP" each occurrence, should read -- TSP --; line 27, "10" should read -- 9 --; line 40, after "left" insert -- in --; line 41, "collect" should read -- collet --; line 43, "he" should read -- the --. Column 4, line 48, "the", first occurrence, should read -- then --; line 67, cancel "and 44 have no affect switch 43"; line 71, before "65" insert -- the switch --; line 73, "movement" should read -- moment --. Column 7, line 48, before "a" insert -- in --. Column 8, line 51, "of" should read -- for --. Column 9, line 49, "100" should read -- 10-0 --; line 68, "he" should read -- the --. Column 10, line 11, "counterclockwise" should be canceled; line 21, "Re. 25,737" should read -- Re. Re. 25,737 --. Column 12, claim 6, line 4, "form" should read -- from --.; claim 7, line 2, "mans" should read - means --.

Signed and sealed this 23rd day of May 1972.

(SEAL)
Attest:

EDWARD M.FLETCHER,JR.　　　　　　ROBERT GOTTSCHALK
Attesting Officer　　　　　　　　Commissioner of Patents